United States Patent
Nakano et al.

(10) Patent No.: US 6,898,508 B2
(45) Date of Patent: May 24, 2005

(54) FUEL INJECTION CONTROL DEVICE

(75) Inventors: Futoshi Nakano, Fujisawa (JP); Akira Hirata, Fujisawa (JP); Koichiro Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 3 days.

(21) Appl. No.: 10/741,287

(22) Filed: Dec. 18, 2003

(65) Prior Publication Data

US 2004/0133335 A1 Jul. 8, 2004

(30) Foreign Application Priority Data

Dec. 20, 2002 (JP) ........................................ 2002-369602

(51) Int. Cl.$^7$ .............................................. G06F 17/00
(52) U.S. Cl. ..................... 701/103; 701/104; 60/285; 60/286; 123/676
(58) Field of Search ............................. 701/103, 104, 701/114; 60/285, 286; 123/672, 676

(56) References Cited

U.S. PATENT DOCUMENTS

| | | | | |
|---|---|---|---|---|
| 5,908,463 A | * | 6/1999 | Akazaki et al. | 701/104 |
| 6,363,312 B1 | * | 3/2002 | Griffin | 701/103 |
| 6,378,297 B1 | * | 4/2002 | Ito et al. | 60/284 |
| 6,412,469 B1 | * | 7/2002 | Itoyama et al. | 123/299 |
| 6,513,484 B1 | * | 2/2003 | Buckland et al. | 123/295 |

FOREIGN PATENT DOCUMENTS

| | | |
|---|---|---|
| JP | 10-288031 | 10/1998 |
| JP | 10-288067 | 10/1998 |

* cited by examiner

*Primary Examiner*—Willis R. Wolfe
*Assistant Examiner*—Johnny H. Hoang
(74) *Attorney, Agent, or Firm*—McCormick, Paulding & Huber LLP

(57) ABSTRACT

A fuel injection control device includes an after treatment device for purifying exhaust gas by the action of a catalyst, an exhaust gas temperature detector for detecting the exhaust gas temperature, and a controller for controlling the fuel injection quantity and fuel injection timing. The controller executes an exhaust gas temperature increase control by post-injection when the exhaust gas temperature detected by exhaust gas temperature detection means is less than the activity temperature of the catalyst in the after treatment device. When executing the exhaust gas temperature increase control, the controller determines the target injection quantity of post-injection based on the difference between the exhaust gas temperature considered as a target and the actual exhaust gas temperature detected by the exhaust gas temperature detector and also determines the upper limit value of injection quantity of post-injection based on the actual exhaust gas temperature detected by the exhaust gas temperature detector, conducts control such that the actual injection quantity of post-injection becomes the upper limit value when the target injection quantity is equal to the upper limit value or higher, and conducts control such that the actual injection quantity of post-injection becomes the target injection quantity when the target injection quantity is less than the upper limit value.

7 Claims, 5 Drawing Sheets

FUEL INJECTION CONTROL DEVICE

CROSS REFERENCE TO RELATED APPLICATION

Applicants hereby claim foreign priority benefits under U.S.C. § 119 of Japanese Patent Application No. 2002-369602, filed on Dec. 20, 2002, and the content of which is herein incorporated by reference.

BACKGROUND OF THE INVENTION

1. Field of the Invention

The present invention relates to a fuel injection control device of a diesel engine equipped with an exhaust gas after treatment device.

2. Description of the Related Art

In diesel engines, it is very important to reduce the contents of particulate matter (PM), nitrogen oxides (NOx) and HC (hydrocarbon) in exhaust gas, and a variety of after treatment devices for reducing those contents have been suggested.

For example, a DPF (diesel particulate filter) of a continuous regeneration type comprises an oxidation catalyst for oxidizing the HC present in exhaust gas and a catalyst-equipped filter disposed downstream of the oxidation catalyst and serving to collect, oxidize and remove the PM present in the exhaust gas. In such a DPF of a continuous regeneration type, first, the HC present in the exhaust gas are oxidized and removed with the oxidation catalyst and then the PM present in the exhaust gas is collected with the catalyst-equipped filter. Under the effect of the catalyst supported in the filter, the collected PM is oxidized and removed and the filter is self-regenerated.

However, in after treatment devices using a catalyst action, such as DPF of a continuous regeneration type, a sufficient exhaust gas purification effect cannot be obtained if the temperature of exhaust gas is below the catalyst activity temperature (for example, no less than 250° C.). For example, when the exhaust gas temperature is low, for example, immediately after the engine is started or in a low-load driving mode, the PM collected by the catalyst-equipped filter cannot be oxidized and removed and there is a risk of the filter becoming clogged.

Accordingly, the exhaust gas temperature was raised by executing post-injection (fuel injection for a catalyst) after the compression dead top center, separately from the usual fuel injection, when the exhaust gas temperature has not reached the activity temperature of the catalyst in the after treatment device. Because with such a post-injection, a large amount of non-combusted gas (HC) is discharged, most of the HC are oxidized with the oxidation catalyst and the exhaust gas temperature rises due to the oxidation reaction heat.

When the aforesaid post-injection is executed, the injection quantity of post-injection is typically determined based on the difference between the exhaust gas temperature which is considered as a target (catalyst activity temperature) and the actual exhaust gas temperature. Therefore, a comparatively large quantity of fuel is post injected when the difference between the target exhaust gas temperature and the actual exhaust gas temperature is comparatively high, for example, immediately after the execution of the exhaust gas temperature increase control by post-injection has been started.

However, when the difference between the target exhaust gas temperature and the actual exhaust gas temperature is high, the temperature of the oxidation catalyst is low and, therefore, the HC treatment capacity of the catalyst is low. For this reason, the problem was that when a large quantity of fuel was post injected, HC were discharged in an amount exceeding the treatment capacity of oxidation catalyst and the HC that could not be treated were discharged as a white smoke.

SUMMARY OF THE INVENTION

It is an object of the present invention to resolve the above-described problem and to provide a fuel injection control device that can execute an exhaust gas temperature increase control by post-injection such as to ensure the purification capacity of the after treatment device and prevents the generation of white smoke at the time of exhaust gas temperature increase control.

In accordance with the first aspect of the present invention, there is provided a fuel injection control device comprising an after treatment device which is provided in an exhaust passage of an internal combustion engine and purifies exhaust gas by the action of a catalyst, exhaust gas temperature detection means for detecting the temperature of exhaust gas passing through the after treatment device, a fuel injector for a catalyst, which is employed to raise the exhaust gas temperature by supplying fuel to the catalyst, and control means for controlling the fuel injection quantity injected by the fuel injector for a catalyst, the control means executing an exhaust gas temperature increase control by conducting fuel injection for a catalyst with the fuel injector for a catalyst and raising the exhaust gas temperature when the exhaust gas temperature detected by the exhaust gas temperature detection means is less than the activity temperature of the catalyst in the after treatment device, wherein when executing the exhaust gas temperature increase control, the control means determines the target injection quantity of the fuel injection for a catalyst based at least on the difference between the exhaust gas temperature which is considered as a target and the actual exhaust gas temperature detected by the exhaust gas temperature detection means and also determines the upper limit value of injection quantity of fuel injection for a catalyst based at least on the actual exhaust gas temperature detected by the exhaust gas temperature detection means, conducts control such that the actual injection quantity of fuel injection for a catalyst becomes the upper limit value when the target injection quantity is equal to the upper limit value or higher, and conducts control such that the actual injection quantity of fuel injection for a catalyst becomes the target injection quantity when the target injection quantity is less than the upper limit value.

With such a configuration, the exhaust gas temperature increase control by post-injection can be executed so as to ensure the purification capacity of the after treatment device and the generation of white smoke and occurrence of torque fluctuations at the time of this exhaust gas temperature increase control can be prevented.

Here, the fuel injector for a catalyst is composed of a fuel injector for injecting fuel into a combustion chamber so as to drive the internal combustion engine, and the control means conducts a separate post-injection after the usual fuel injection with the fuel injector, as the fuel injection for a catalyst, when the exhaust gas temperature detected by the exhaust gas temperature detection means is less than the activity temperature of the catalyst in the after treatment device.

Further, the upper limit value preferably rises according to the rise of exhaust gas temperature detected by the exhaust gas temperature detection means.

Furthermore, it is also preferred that when executing the exhaust gas temperature increase control, the control means determines the base injection quantity of the fuel injection for a catalyst based on the operation state of the internal combustion engine, such as a load and a revolution speed, determines the target injection quantity of the post-injection by computing a correction term including at least an integral term of injection quantity of the fuel injection for a catalyst based on the difference between the exhaust gas temperature considered as a target and the actual exhaust gas temperature detected by the exhaust gas temperature detection means and adding up the base injection quantity and the correction term, and conducts no integration of the integral term when the target injection quantity is equal to the upper limit value or higher, or equal to the lower limit value or lower and the difference therebetween is negative.

DESCRIPTION OF THE PREFERRED EMBODIMENTS

The preferred embodiment of the present invention will be described hereinbelow based on the appended drawings.

Figure 1:
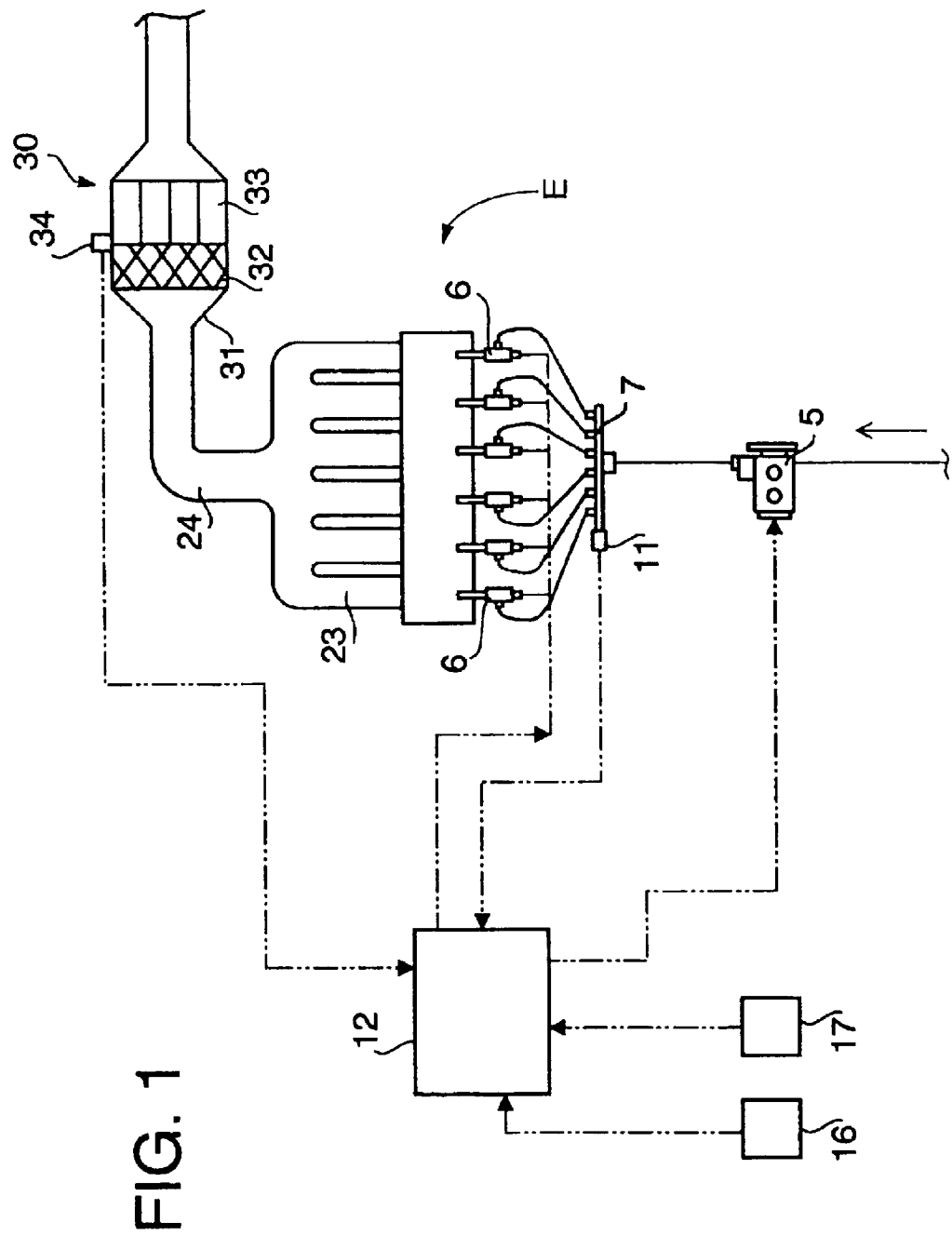
FIG. 1 is a schematic view of a fuel injection control device of an embodiment of the present invention and an internal combustion engine equipped therewith.

FIG. 1 is a schematic view of the fuel injection control device of the present embodiment and an internal combustion engine equipped therewith.

The engine E (internal combustion engine) employing the fuel injection control device of the present embodiment is a six-cylinder diesel engine equipped with a common-rail fuel injection device.

The fuel injection control device of the present embodiment comprises a supply pump 5 for supplying fuel from a fuel tank (not shown in the figure) to a common rail 7 and multiple fuel injectors (injectors 6) connected to the common rail 7 for injecting the fuel into the combustion chambers of cylinders of the engine E.

The supply pump 5 is a pressure-adjustable pump in which the discharge pressure can be adjusted. The discharge pressure of the pump is controlled by a controller (control means) 12.

A pressure sensor 11 is provided in the common rail 7, and the fuel pressure inside the common rail 7 is detected with the pressure sensor 11 and the detected value is inputted into the controller 12.

Each fuel injector 6 is connected to the controller 12 and controlled (driven) by the drive signal outputted from the controller 12. Detection means such as an engine revolution sensor 16 for detecting the revolution speed of the engine E and an accelerator opening degree sensor 17 for detecting the accelerator opening degree (engine load) in the vehicle are connected to the controller 12. The detected values of each detection means 16 and 17 are inputted into the controller 12. The controller 12 determines the fuel injection quantity and the fuel injection period (timing) from the usual fuel injection maps that have been inputted in advance, based on the actual engine revolution speed detected by the engine revolution sensor 16 and the actual accelerator opening degree detected by the accelerator opening degree detector 17. Then, the controller 12 outputs a drive signal to each fuel injector 6 according to the fuel injection quantity and fuel injection timing.

The exhaust port of each cylinder of the engine is connected to one collector exhaust pipe (exhaust channel) 24 via an exhaust manifold 23, and an after treatment device is provided for purifying the exhaust gas in the collector exhaust pipe 24. The after treatment device 30 of the present embodiment is the so-called DPF of a continuous regeneration type which comprises a casing 31 formed integrally with the collector exhaust pipe 24, an oxidation catalyst 32 disposed on the upstream side inside the casing 31 and serving to oxidize the HC present in the exhaust gas, and a catalyst-equipped filter 33 which is disposed inside the casing 31 downstream of the oxidation catalyst 32 and serves to collect, oxidize and remove the PM present in the exhaust gas. The catalyst-equipped filter 33 is obtained, for example, by supporting, e.g., a zeolite catalyst on a monolith honeycomb filter of a wall flow type made of ceramics or a fibrous filter consisting of ceramic or metallic fibers.

When the exhaust gas passes inside the DPF 30, first, the HC present in the exhaust gas are oxidized and removed by the action of the oxidizing catalyst 32. Then, the PM present in the exhaust gas is collected by the filter 33, and the collected PM is oxidized and removed by the action of the catalyst located in the filter.

A sensor (exhaust gas temperature detection means) 34 for detecting the temperature of exhaust gas in the inlet opening of the catalyst-equipped filter 33 is provided between the oxidation catalyst 32 and the catalyst-equipped filter 33 of the DPF 30. The detected value of this sensor 34 is transmitted to the controller 12.

The intake pipes of the engine E are omitted in FIG. 1.

As described in the Description of the Related Art section of the present specification, unless the temperature of the exhaust gas passing through the DPF 30 (simply referred to herein as the exhaust gas temperature) reaches the activity temperature (for example, 250° C.) of the catalyst in the DPF 30 using the catalyst action, the PM collected by the catalyst-equipped filter 33 cannot be oxidized and removed and automatic regeneration is impossible. Accordingly, when the quantity of the PM collected in the catalyst-equipped filter 33 reaches the fixed quantity, the exhaust gas temperature increase control by post-injection (fuel injection for a catalyst) is executed and the catalyst-equipped filter 33 is forcibly regenerated. Thus, when post-injection is carried out after the compression top dead center separately from the usual fuel injection conducted according to the above-described fuel injection map, the non-combusted gas (HC) is supplied to the oxidation catalyst 32 and the exhaust gas temperature is raised by using the reaction heat of the HC in the oxidation catalyst 32. Thus, the fuel injector 6 of the present embodiment also has a function of the fuel injector for a catalyst in the patent claims.

The term "usual fuel injection" as used in the present specification is a general term describing all the injections, except the post-injection. In other words, this term means a main injection when applied to the engines of the type in which only the main injection is carried out when the exhaust gas temperature increase control is not executed, and means the fuel injection combining all the types of injection when applied to the engines of the type in which a plurality of injections, e.g., pre-injection and main injection, are carried out.

Further, the quantity of the PM collected by the catalyst-equipped filter 33 is computed constantly or within the prescribed periods from, e.g., a pressure loss in the inlet and outlet openings of the DPF 30, and the aforesaid exhaust gas temperature increase control is executed if a decision is made that the accumulated quantity of the PM has reached the prescribed value or became higher. It goes without saying that the exhaust gas temperature increase control is not executed when the exhaust gas temperature in the inlet portion of the catalyst-equipped filter 33, which is detected with the sensor 34, is higher than the activity temperature of the catalyst.

In the course of the exhaust gas temperature increase control, the controller 12 determines the injection quantity and injection timing for the usual fuel injection according to the aforesaid usual fuel injection map and also determines the target injection quantity and injection timing of post-injection (fuel injection for a catalyst) by conducting feedback of the actual exhaust gas temperature detected by the sensor 34. Furthermore, the controller 12 determines the upper limit value of injection quantity of post-injection based on the actual exhaust gas temperature detected by the sensor 34 and limits the actual injection quantity of post-injection by this upper limit value. More specifically, the controller 12 compares the target injection quantity and the upper limit value and outputs a signal to the fuel injector 6 such that the actual injection quantity of post-injection becomes the upper limit value when the target injection quantity is the upper limit value or less, or outputs a signal to the fuel injector 6 such that the actual injection quantity of post-injection becomes the target injection quantity when the target injection quantity is less than the upper limit value. Therefore, the actual injection quantity of post-injection necessarily assumes a value which is less than or equal to the upper limit value.

The upper limit value is the injection quantity of post injection at which the amount of HC discharged is almost equal to the maximum amount that can be treated by the oxidation catalyst 32 and varies according to changes in the treatment capacity (almost proportional to the exhaust gas temperature) of the oxidation catalyst 32. Therefore, if the injection quantity of post injection is equal to the upper limit value or lower, the entire amount of discharged HC can be oxidized with the oxidation catalyst 32 and is not discharged as a white smoke.

A method for determining the injection quantity of post injection during the exhaust gas temperature increase control will be described hereinbelow with reference to FIGS. 2 through 4.

Figure 2:
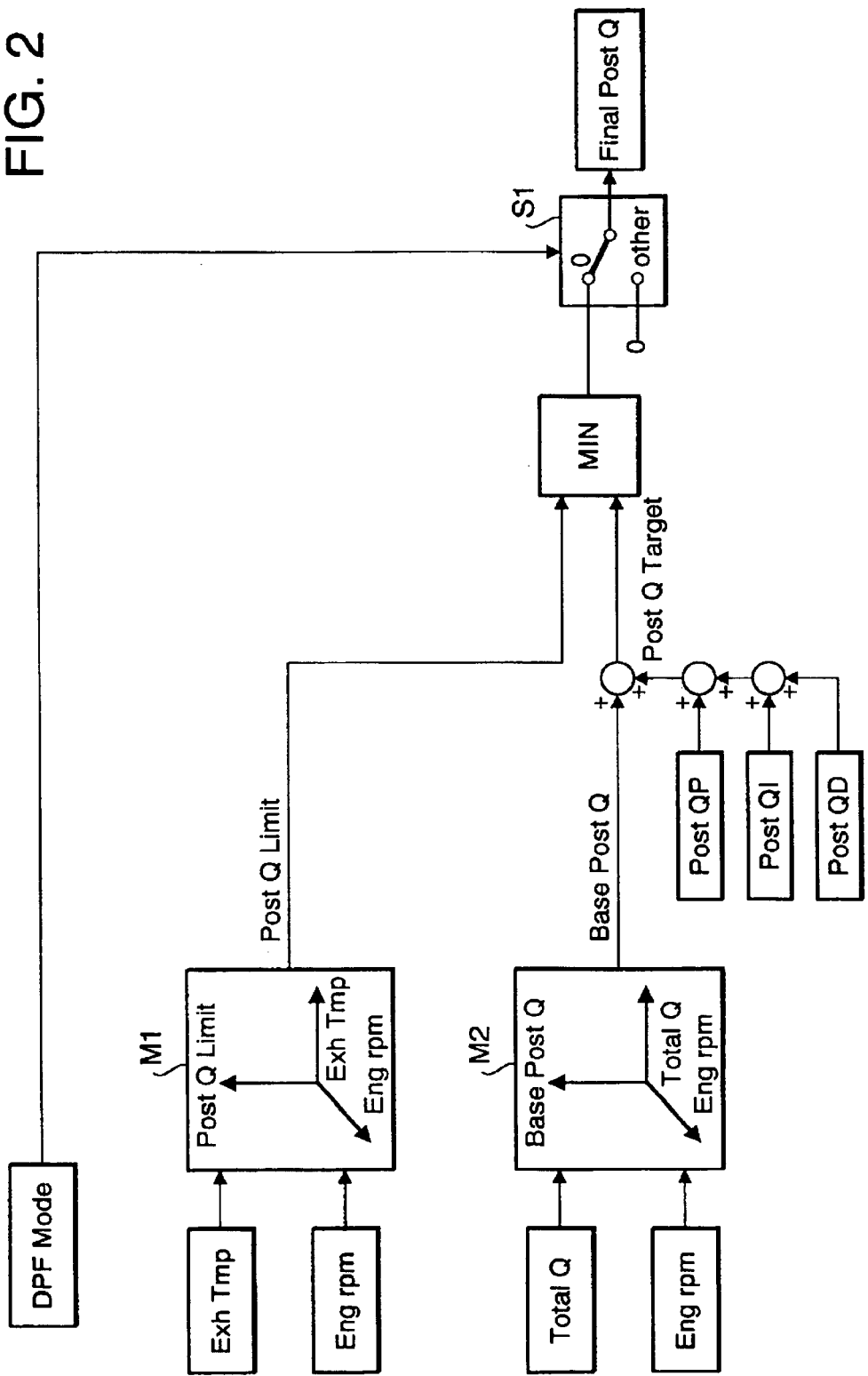
FIG. 2 is a block diagram for determining the injection quantity of post-injection.

First, referring to FIG. 2, the upper limit value "Post Q Limit" of injection quantity of post injection can be determined from the map M1 based on the exhaust gas temperature "Exh Tmp" detected by the sensor 34 and the actual engine revolution speed "Eng rpm" detected by the engine revolution sensor 16. As mentioned hereinabove, the upper limit value "Post Q Limit" is the maximum injection quantity at which no white smoke is generated, and the map M1 is created based on the data obtained, e.g., by preliminary tests.

Figure 3:
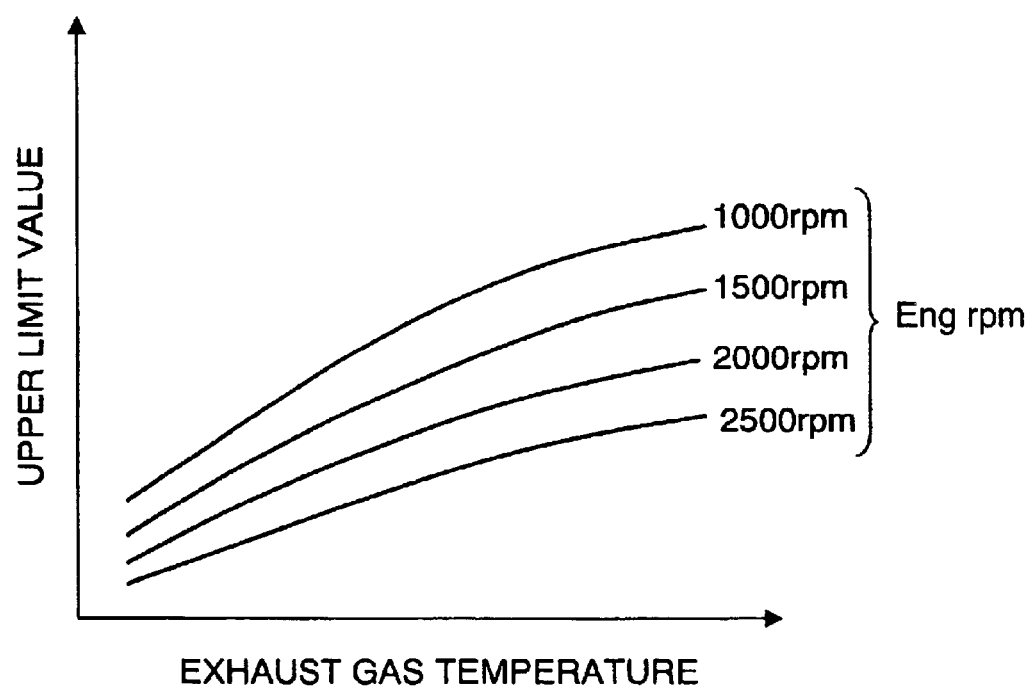
FIG. 3 is an example of the map used for determining the upper limit value of the injection quantity of post-injection.
Figure 4:
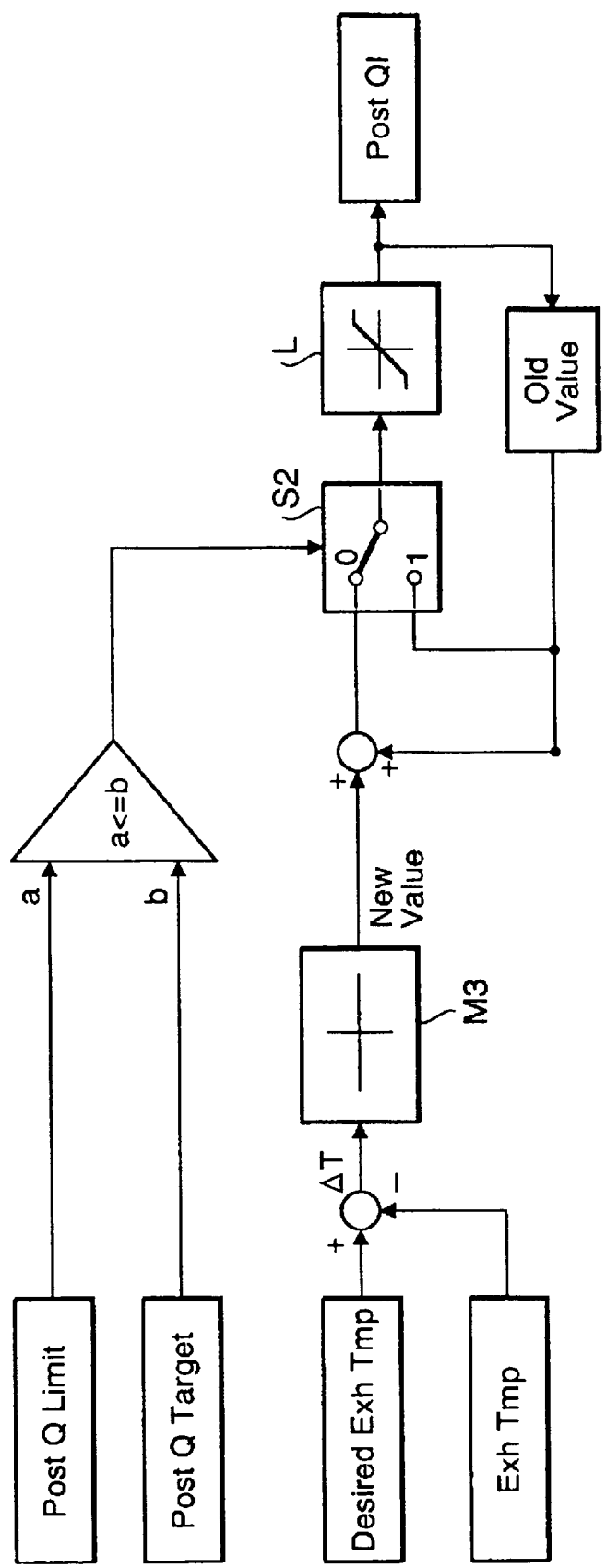
FIG. 4 is a block diagram for determining the integral term of injection quantity of post-injection.

An example of map M1 is shown in FIG. 3.

Usually, the treatment capacity of a catalyst depends on the catalyst temperature and the flow rate of exhaust gas, and the treatment capacity tends to increase with the increase in the catalyst temperature and decease in the flow rate of exhaust gas. Accordingly, as shown in FIG. 3, the map M1 is usually created so that the upper limit value "Post Q Limit" increases with the increase in exhaust gas temperature (almost proportional to the temperature of the oxidation catalyst 32) in the inlet portion of the catalyst-equipped filer 33 and so that the upper limit value "Post Q Limit" decreases with the increase in engine revolution speed "Eng rpm" (almost proportional to the flow rate of exhaust gas).

Returning to FIG. 2, the base injection quantity of post injection "Base Post Q" is determined from the map M2 based on the total injection quantity of the usual fuel injection "Total Q" determined from the aforesaid usual fuel injection map and the actual engine revolution speed "Eng rpm" detected by the engine revolution sensor 16. Furthermore, the correction terms (proportional term "Post Q P", integral term "Post Q I", and differential term "Post Q D") of injection quantity of post injection are computed based on the difference between the target exhaust gas temperature and the actual exhaust gas temperature detected by the sensor 34. The base injection quantity "Base Post Q" and all the correction terms ("Post Q P", "Post Q I", and "Post Q D") are then added up and the target injection quantity of post injection "Post Q Target" is determined.

The base injection quantity "Base Post Q" is the injection quantity necessary to raise the actual exhaust gas temperature to the target exhaust gas temperature, and the map M2 is created based on the data obtained, e.g., by preliminary tests. The base injection quantity "Base Post Q" usually assumes a low value if the total injection quantity "Total Q" of the usual fuel injection is high and the engine revolution speed "Eng rpm" is high.

The total injection quantity "Total Q" of the usual fuel injection is determined based on the actual engine revolution speed "Eng rpm" detected by the engine revolution sensor 16 and the actual accelerator opening degree detected by the accelerator opening degree sensor 17. Therefore, it can be also said that the base injection quantity of post-injection "Base Post Q" is determined by the engine revolution speed and accelerator opening degree (engine load).

The controller 12 compares the upper limit value of post-injection "Post Q Limit" determined from the map M1 and the target injection quantity of post-injection "Post Q Target". The smaller of the two is selected as the final determined injection quantity "Final Post Q" which is to be finally controlled. The controller 12 outputs a signal to the fuel injectors 6 according to the final determined injection quantity "Final Post Q". In other words, an electric current is passed through the fuel injectors 6 in the timing corresponding to the final determined injection quantity "Final Post Q".

When the exhaust gas temperature increase control mode (DPF Mode) is OFF, the switch S1 is switched to the other side and the final determined injection quantity "Final Post Q" becomes zero. This is obviously because no post-injection is carried out outside the exhaust gas temperature increase control mode.

A method for determining the integral term "Post Q I" in FIG. 2 will be described hereinbelow with reference to FIG. 4.

First, the difference ΔT is computed between the target exhaust gas temperature "Desired Exh Temp" in the inlet portion of the catalyst-equipped filter 33 and the actual exhaust gas temperature "Exh Tmp" in the inlet portion of the catalyst-equipped filter 33 detected by the sensor 34, and the present value "New Value" of the integral term is determined from the map M3 based on this difference ΔT. Then, an integral term "Post Q I" is determined by adding the previous value "Old Value" to the present value "New Value". The integral term "Post Q I" is limited by the upper limit value and the lower limit value with a limiter L.

In the present embodiment, when the aforesaid target injection quantity "Post Q Target" is equal to the upper limit value "Post Q Limit" or higher, the integration of the integral term "Post Q I" is prohibited. Thus, when the target injection quantity "Post Q Target" is equal to the upper limit value "Post Q Limit" or higher, the switch S2 is connected to side 1 and the previous value "Old Value" is directly determined as the integral term "Post Q I". Essentially, integration of the present value "New Value" is prohibited. This is because when the target injection quantity "Post Q Target" is equal to the upper limit value "Post Q Limit" or higher, as described hereinabove, the actual post-injection quantity is controlled to the upper limit value "Post Q Limit" which is less than the target injection quantity "Post Q Target" and, therefore, if integration of the integral term is conducted within this period, the integral term "Post Q I" and the target injection quantity "Post Q Target" rapidly assume large values.

Furthermore, in the present embodiment, integration of the present value "New Value" is also prohibited when the target injection quantity "Post Q Target" is equal to the prescribed lower limit value or below it and the aforesaid difference ΔT is negative. This is done to prevent over-integration of the integral term "Post Q I" on the negative side.

Figure 5:
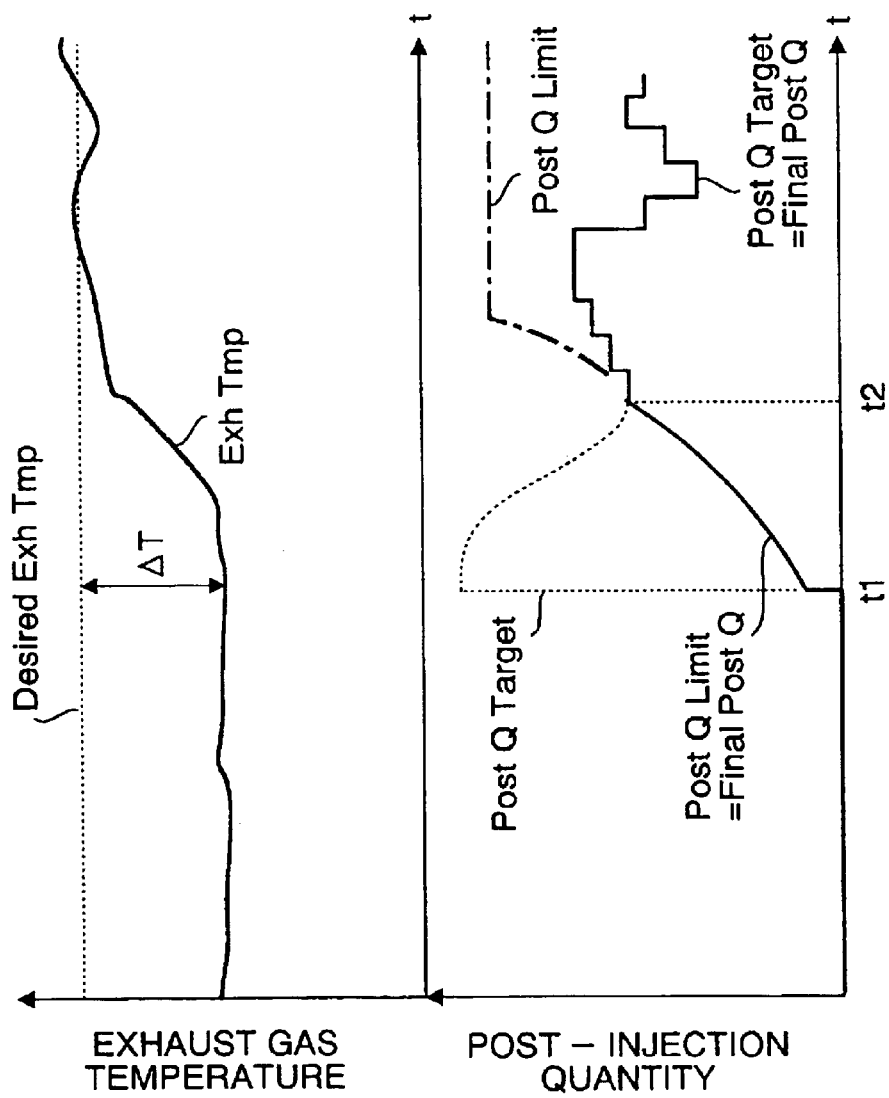
FIG. 5 is a graph illustrating changes in the exhaust gas temperature and post-injection quantity that occurred when the exhaust gas temperature increase control of the present invention was executed.

An example of changes in the actual exhaust gas temperature and post-injection quantity occurring when the exhaust gas temperature increase control is executed with the fuel injection control device of the present embodiment will be described hereinbelow with reference to FIG. 5.

In the figure, time t is plotted against the abscissa, the exhaust gas temperature is plotted against the ordinate in the upper graph, and the post-injection quantity is plotted against the ordinate in the lower graph.

In the instant t1 of time, the exhaust gas temperature "Exh Tmp" of the inlet portion of the catalyst-equipped filter 33 which is detected by the sensor 34 is less than the target exhaust gas temperature "Desired Exh Tmp", and the amount of PM collected in the catalyst-equipped filter 33 of the DPF 30 has reached the prescribed amount. Therefore, the exhaust gas temperature increase control by post-injection is to be started.

The controller 12 determines the target injection quantity of post-injection "Post Q Target" and upper limit value "Post Q Limit" according to the block diagram shown in FIG. 2. In the example shown in the figure, immediately after the exhaust gas temperature increase control has been started, the difference ΔT between the target exhaust gas temperature "Desired Exh Tmp" and the actual exhaust gas temperature "Exh Tmp" is comparatively large, and the target injection quantity "Post Q Target" assumes a value higher than the upper limit value of the post-injection quantity "Post Q Limit". For this reason, the controller 12 selects the upper limit value "Post Q Limit" as the final determined injection quantity "Final Post Q" and outputs a signal to fuel injectors 6 according to the upper limit value "Post Q Limit".

If the post-injection corresponding to the upper limit value "Post Q Limit" is executed, HC are discharged into the exhaust gas, those HC are oxidized by the oxidation catalyst 32, and the temperature of exhaust gas is gradually increased by the reaction heat. At this time, the amount of discharged HC corresponds to the treatment capacity of the oxidation catalyst 32 and no white smoke is generated.

As the exhaust gas temperature rises, the capacity of the oxidation catalyst 32 is increased and the upper limit value "Post Q Limit" similarly rises. Further, as described hereinabove, while the upper limit value "Post Q Limit" is less than the target injection quantity "Post Q Target", integration of the present value "New Value" of the integral term in FIG. 4 is not conducted. Immediately after the exhaust gas temperature increase control has been started, the previous value "Old Value" of the integral term is zero. Therefore, the integral term is zero as long as the upper limit value "Post Q Limit" is less than the target injection quantity "Post Q Target".

If the upper limit value "Post Q Limit" and the target injection quantity "Post Q Target" are inverted and the target injection quantity "Post Q Target" becomes less than the upper limit value "Post Q Limit" in the instant t2 of time, the controller 12 selects the target injection quantity "Post Q Target" as the final determined injection quantity "Final Post Q" and outputs a signal to the fuel injectors 6 according to the target injection quantity "Post Q Target". The integration of the integral term is then started from the instant t2 of time. In other words, feedback control is conducted so that the actual exhaust gas temperature "Exh Tmp" becomes the target exhaust gas temperature "Desired Exh Tmp". Furthermore, because the target injection quantity "Post Q Target" at this time is less than the upper limit value "Post Q Limit", the amount of discharged HC is obviously such that can be treated by the oxidation catalyst 32 and no white smoke is generated.

As a result, the actual injection quantity of post-injection changes as shown by a solid line in the figure.

Thus, with the fuel injection control device of the present embodiment, the injection quantity of post-injection is limited according to the treatment capacity of the oxidation catalyst 32. Therefore, no white smoke is generated during exhaust gas temperature increase control.

Furthermore, immediately after the start of the exhaust gas temperature increase control, the injection quantity of post-injection is limited to a comparatively small quantity. Therefore, torque fluctuations caused by post-injection are small and drivability degradation can be prevented.

The present invention is not limited to the above-described embodiment and various modifications thereof can be considered.

For example, computing the temperature of exhaust gas passing through the after treatment device 30, e.g. from the revolution speed or load of the engine E, rather than detecting this temperature with the sensor 34, can be also considered.

Furthermore, in the above-described embodiment, the type of engine was considered in which a fuel injector 6 for injecting fuel into a combustion chamber for driving the engine E was described as the fuel injector for a catalyst, which is used to increase the exhaust gas temperature by supplying fuel to the oxidation catalyst 32. However, the present invention is not limited to such a structure. For example, it is also possible to provide a fuel injector for a catalyst upstream of the after treatment device 30 inside the exhaust passage 24 separately from the aforesaid fuel injector 6 and to execute fuel injection for a catalyst with this separate fuel injector for a catalyst when the exhaust gas temperature increase control is conducted.

Furthermore, in the above-described embodiment, an example was explained in which a PID control was conducted by using a proportional term P, an integral term I, and a differential term D as the correction terms for an injection quantity of post-injection. However, the present invention is not limited to such a structure, and an I control using only the integral term or a PI control using the proportional term P and the integral term I may be also conducted.

Further, the present invention is not limited to the after treatment device of the above-described type and is applicable to engines equipped with after treatment devices of other types, provided they employ a catalytic action.

What is claimed is:

1. A fuel injection control device, comprising:
    an after treatment device which is provided in an exhaust passage of an internal combustion engine and purifies exhaust gas by the action of a catalyst;
    exhaust gas temperature detection means for detecting an exhaust gas temperature passing through said after treatment device;
    a fuel injector for a catalyst, which is employed to raise the exhaust gas temperature by supplying fuel to said catalyst; and
    control means for controlling a fuel injection quantity injected by said fuel injector for a catalyst,
    said control means executing an exhaust gas temperature increase control by conducting fuel injection for a catalyst with said fuel injector for a catalyst and raising the exhaust gas temperature when the exhaust gas temperature detected by said exhaust gas temperature detection means is less than an activity temperature of the catalyst in said after treatment device,
    wherein when executing said exhaust gas temperature increase control, said control means determines a target injection quantity of said fuel injection for a catalyst based at least on the difference between the exhaust gas temperature which is considered as a target and an actual exhaust gas temperature detected by said exhaust gas temperature detection means and also determines an upper limit value of injection quantity of fuel injection for a catalyst based at least on the actual exhaust gas temperature detected by said exhaust gas temperature detection means, conducts control such that the actual injection quantity of fuel injection for a catalyst becomes said upper limit value when said target injection quantity is equal to said upper limit value or higher, and conducts control such that the actual injection quantity of fuel injection for a catalyst becomes said target injection quantity when said target injection quantity is less than said upper limit value.

2. The fuel injection control device according to claim 1, wherein said fuel injector for a catalyst comprises a fuel injector for injecting fuel into a combustion chamber so as to drive said internal combustion engine, and said control means conducts a separate post-injection after the usual fuel injection with said fuel injector, as said fuel injection for a catalyst, when the exhaust gas temperature detected by said exhaust gas temperature detection means is less than the activity temperature of the catalyst in said after treatment device.

3. The fuel injection control device according to claim 2, wherein said upper limit value rises according to the rise of exhaust gas temperature detected by said exhaust gas temperature detection means.

4. The fuel injection control device according to claim 2, wherein when executing said exhaust gas temperature increase control, said control means determines the base injection quantity of said fuel injection for a catalyst based on the operation state of said internal combustion engine, such as a load and a revolution speed, determines the target injection quantity of said post-injection by computing a correction term including at least an integral term of injection quantity of said fuel injection for a catalyst based on the difference between said exhaust gas temperature considered as a target and the actual exhaust gas temperature detected by said exhaust gas temperature detection means and adding said base injection quantity and said correction term, and conducts no integration of said integral term when said target injection quantity is equal to said upper limit value or higher, or equal to the lower limit value or lower and the difference therebetween is negative.

5. The fuel injection control device according to claim 1, wherein said upper limit value rises according to the rise of exhaust gas temperature detected by said exhaust gas temperature detection means.

6. The fuel injection control device according to claim 5, wherein when executing said exhaust gas temperature increase control, said control means determines the base injection quantity of said fuel injection for a catalyst based on the operation state of said internal combustion engine, such as a load and a revolution speed, determines the target injection quantity of said post-injection by computing a correction term including at least an integral term of injection quantity of said fuel injection for a catalyst based on the difference between said exhaust gas temperature considered as a target and the actual exhaust gas temperature detected by said exhaust gas temperature detection means and adding said base injection quantity and said correction term, and conducts no integration of said integral term when said target injection quantity is equal to said upper limit value or higher, or equal to the lower limit value or lower and the difference therebetween is negative.

7. The fuel injection control device according to claim 1, wherein when executing said exhaust gas temperature increase control, said control means determines a base injection quantity of said fuel injection for a catalyst based on the operation state of said internal combustion engine, such as a load and a revolution speed, determines the target injection quantity of said post-injection by computing a correction term including at least an integral term of injection quantity of said fuel injection for a catalyst based on the difference between said exhaust gas temperature considered as a target and the actual exhaust gas temperature detected by said exhaust gas temperature detection means and adding said base injection quantity and said correction term, and conducts no integration of said integral term when said target injection quantity is equal to said upper limit value or higher, or equal to the lower limit value or lower and the difference therebetween is negative.

* * * * *